May 3, 1932. F. AUSTIN 1,856,065
AGRICULTURAL IMPLEMENT
Filed Aug. 26, 1931
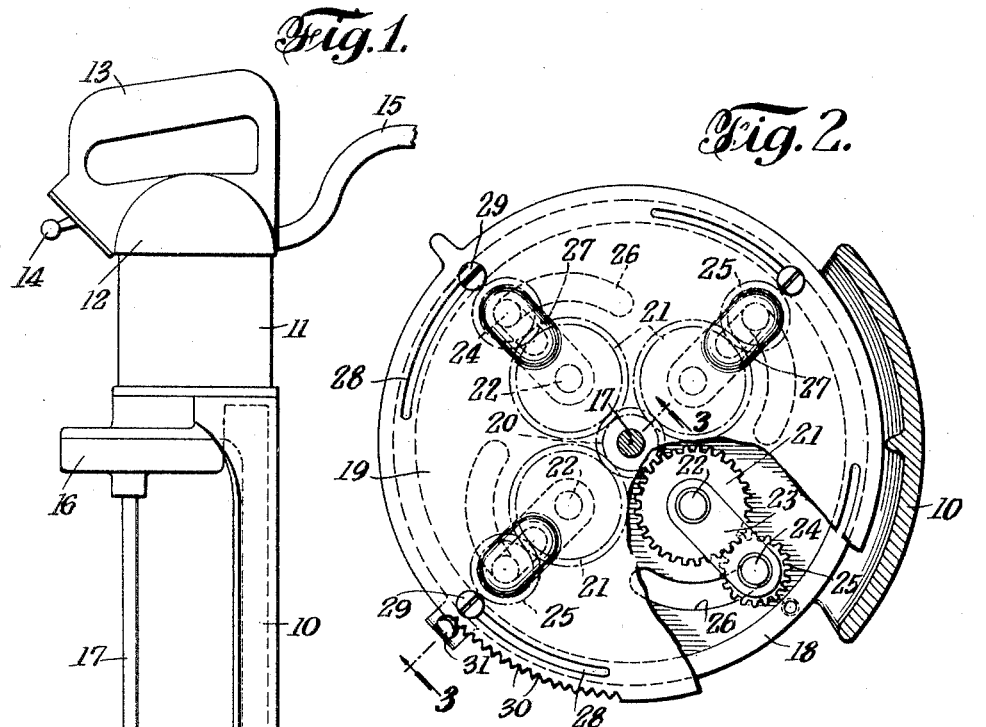
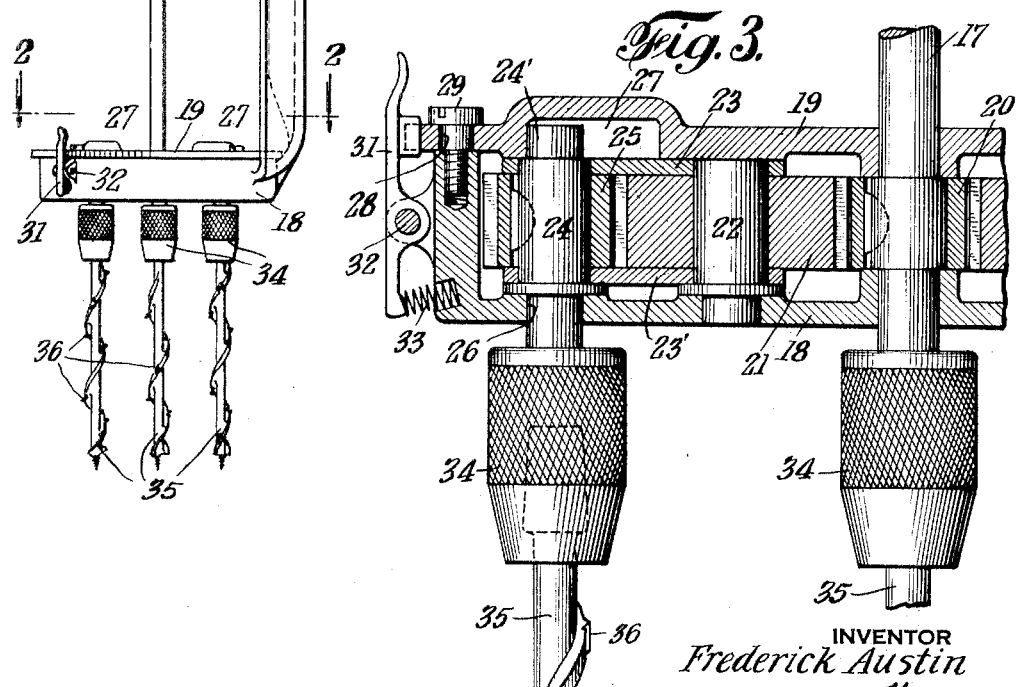
INVENTOR
Frederick Austin
BY
ATTORNEY Patented May 3, 1932

1,856,065

UNITED STATES PATENT OFFICE

FREDERICK AUSTIN, OF BAYSIDE, NEW YORK

AGRICULTURAL IMPLEMENT

Application filed August 26, 1931. Serial No. 559,377.

This invention relates to improvements in agricultural implements, and more particularly to seed hole drills whereby a plurality of seeds may be entered into the ground.

Ordinarily, sowing is accomplished by producing a series of furrows in the surface of the soil, in which seeds are sown by hand, thereafter to be covered by an appropriate implement, usually necessitating bending of the back and limbs, being tiresome in the extreme and requiring the replacement of considerable quantities of sod or earth.

Having these matters in mind, it is an object of this invention to provide a hand controlled, power driven implement capable of being used by a person in an erect position, avoiding the necessity of furrowing the ground or other heavy labor, or otherwise upsetting the earth except where the seeds are to be deposited.

A further purpose is to provide means by which the seeds are implanted at regular intervals, one from another, the spacing being adjusted as may be preferred.

Another aim is to produce a simple, inexpensive apparatus which may be operated without previous experience and by means of which the seeds may be planted at any predetermined depth.

These advantageous objects are accomplished by the novel construction, arrangement and combination of parts hereinafter described and shown in the accompanying drawings, constituting an essential component of this disclosure, and in which:

Fig. 1 is a side elevational view of an embodiment of the invention as fully assembled.

Fig. 2 is a transverse sectional view taken on line 2—2 of Fig. 1, and drawn to an increased scale.

Fig. 3 is a partial longitudinal sectional view, taken on line 3—3 of Fig. 1, and drawn to a further enlarged scale.

The apparatus comprises a rigid frame 10 of arcuate cross section, having at its upper end a casing 11 containing an electric motor. Above the casing is a cap 12 surmounted by a handle 13 and provided with a switch 14 for controlling current entering through the cable 15.

The motor shaft is reduced in speed by gearing contained in gear box 16 through which extends a driving shaft 17.

Formed on the lower end of the frame 10 is a cylindrical casing 18 on which is rotatably mounted a cap 19 through which the shaft 17 extends.

Fixed on the shaft 17, between its bearings in the casing and cap, is a spur pinion 20 meshed with four intermediate gears 21 carried on spindles 22, mounted to rotate in strap plates 23—23' which also provide bearings for spindles 24 having secured on them driving pinions 25.

These strap plates 23—23' are adapted to swing on the axis of the spindles 22 and are guided at their lower ends in arcuately curved slots 26 in the lowermost wall in the cylindrical casing 18.

The upper ends 24' of the spindles 24 are reduced, and are movably received in cam slots 27 on the cap plate 19, which is further provided with concentric slots 28 near its periphery, the same being receptive of shoulder studs 29 set in the walls of the casing 18 and provided with enlarged heads which act to retain the cap in place when the casing and its cap are turned relatively.

A series of teeth 30 are formed on a portion of the periphery of the cap 19, engageable with which is a handled detent 31, mounted on a pin 32 set in a lug extending outward from the wall of the casing 18, the detent being held in an engaging position by a compression spring 33, these elements being best seen in Fig. 3.

Fixed on the lower ends of the shaft 17, and also the corresponding ends of the spindle 24, are chucks 34 adapted to engage, rigidly hold and rotate the stems of drills 35. These drills may be provided with notches, spurs or other roughening means such as at 36.

It will now be understood that when the motor is energized, rotation of the motor will be conducted, at a reduced rate of speed, to the shaft 17 and thence through the driving pinion 20, idle gears 21 and driven pinions 25 to the chuck-carrying spindles, causing the same to rotate.

As the pinion 20 is equivalent in diameter to the pinions 25 the speed of the drills will be maintained uniformly, and, due to the interposition of the idle gears 21, all of the several drills will rotate in the same direction.

If it be desired to decrease the radial distances between the drills thereby to plant the seeds more closely, it is readily accomplished by retracting the detent 31 and turning the cap 19, relative to the casing 18, whereupon the guide slots 26 in the casing cause the plates 23—23' to swing toward the center, reducing the distance between the drills.

Although there has been described with considerable detail the use of the implement for producing seed-receiving orifices, it will nevertheless be understood that the implement may have many and various other uses in the agricultural line.

Another important use to which the implement may be put is to break ground and loosen up the soil wherever desired and thus obviate the heavy and arduous task of accomplishing this work with a hoe.

Although the foregoing is descriptive of the preferred embodiment of the invention, it will be apparent that minor changes may be made in its construction, without the exercise of invention or conflicting with the scope of the claims hereto appended.

Having thus described the invention, what is claimed as new and desired to secure by Letters Patent, is:—

1. An implement for producing seed-receiving orifices, comprising a frame having a motor mounted at its upper end, a casing at the lower end, a plurality of drill carrying spindles journalled in said casing, a shaft driven by said motor to extend centrally through said casing, said shaft having a drill at its end in a plane coincident with the other drills, and geared connections between said shaft and said spindles.

2. An implement for producing seed-receiving orifices, comprising a frame having a motor mounted at its upper end, a casing at the lower end, a shaft driven at a reduced speed by the motor to extend through said casing and having a drill at its end, a row of spindles concentric with said shaft each having a drill at its end, a pinion on said shaft, a pinion on each of said spindles, and intermediate gears between the shaft pinion and each spindle pinion.

3. An implement for producing seed-receiving orifices, comprising a frame carrying a motor and a casing, a shaft extending from the motor through said casing, a row of spindles in said casing concentric with said shaft, driving connections between each spindle and said shaft, drills removably engaged at the ends of said spindles and shaft, and cooperating means in the top and bottom of the casing adapted to adjust the spindles uniformly at varying distances from the shaft.

4. An implement for producing seed-receiving orifices comprising a frame having a motor mounted at its upper end, a casing at the lower end, a shaft driven at a reduced speed by the motor to extend through said casing, a row of spindles in said casing concentric with said shaft, gear trains connecting between each spindle and said shaft, means to adjust the radial distance of the spindles relative to the shaft, and drills removably engaged at the ends of said spindles and shaft.

5. An implement for producing seed-receiving orifices, comprising a frame adapted for manual operation, a motor at one end of said frame, a casing at the opposite end, a cap for said casing, a shaft driven by said motor extending through said casing, a plurality of spindles arranged concentrically about said shaft, studs fixed in said casing and having idler gears revoluble thereon, a pinion on said shaft meshed with all of said gears, pinions on said spindles also in mesh with the idler gears, strap plate bearings for said spindles pivoted on said studs, means for rotating said cap relative to the casing, said cap having cam slots to move said spindles towards and from said shaft, and drills removably engaged with said spindles and shaft.

6. An implement for producing seed-receiving orifices, comprising a frame adapted for manual operation, a motor at one end of said frame, a casing at the opposite end, a cap for said casing, a shaft driven by said motor extending through said casing, a plurality of spindles arranged concentrically about said shaft, studs fixed in said casing and having idler gears revoluble thereon, a pinion on said shaft meshed with all of said gears, pinions on said spindles also in mesh with the idler gears, bearings for said spindles pivoted on said studs, cam slots in said cap controlling the position of said spindles, a peripheral rack on said cap, a spring actuated detent engageable with the teeth of said rack, and drills removably engaged at the ends of all of said spindles and shaft.

7. An implement for producing seed-receiving orifices, comprising a frame carrying a motor and a casing, a shaft extending from the motor through said casing, a row of spindles in said casing concentric with said shaft, driving connections between each spindle and said shaft, drills removably engaged at the ends of said spindles and shaft, and means to simultaneously, adjustably vary the radial distance between the spindles and said shaft, and the angular distances between the several spindles.

8. An implement for producing seed-receiving orifices, comprising a frame adapted for manual operation, a motor at one end of said frame, a casing at the opposite end, a cap for said casing, a shaft driven by said motor extending through said casing, a plurality of spindles arranged concentrically about said shaft, studs fixed in said casing and having idler gears revoluble thereon, a pinion on said shaft meshed with all of said gears, pinions on said spindles also in mesh with the idler gears, strap plate bearings for said spindles pivoted on said studs, radial cam slots in the cap within which one end of the studs is engaged, and arcuate guide slots in the casing within which the other end of the studs are engaged, and drills removably engaged with said spindles and shaft.

Signed at New York, in the county and State of New York, this 24th day of August, 1931.

FREDERICK AUSTIN.